Patented Feb. 25, 1941

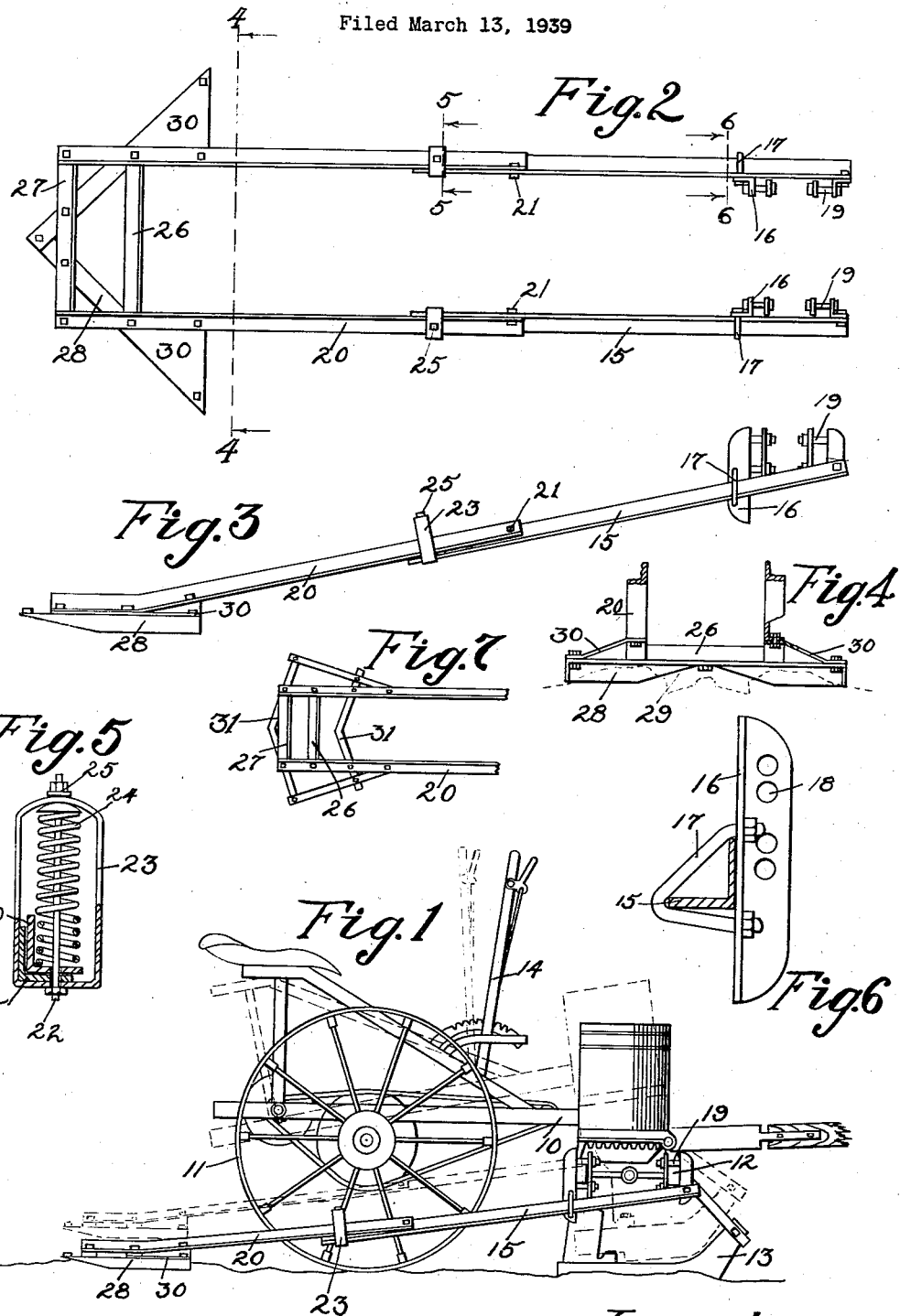

2,232,814

UNITED STATES PATENT OFFICE 2,232,814

DRAG ATTACHMENT FOR PLANTERS

John Underation, Albia, Iowa

Application March 13, 1939, Serial No. 261,505

4 Claims. (Cl. 111—52)

My invention is in the nature of a drag device of simple, durable and inexpensive construction in the nature of an attachment for corn planters and the like and which, when in use, will fill the furrows formed by the planter runners and the planter wheels, and form ridges over the planted rows so that if soil erosion occurs after planting, the planted seeds in the rows will not be washed out.

More specifically, it is my object to provide a drag attachment of this class which will move soil from the sides of the planter rows, drag it toward the centers of the planted rows, break up clods of soil, fill depressions at the planted rows, and yieldingly press the soil downwardly to make it firm and slightly higher at the rows to thereby prevent water from washing out the planted seeds.

A further object is to provide means for automatically raising the drag attachment to position out of engagement with the soil when the planter runners are elevated as when turning at the end of a row.

In the accompanying drawing, Figure 1 shows a side elevation of a planter having my improved drag attachment applied thereto. In this view, by dotted lines the position of the furrow opening runners and the drag attachment is shown elevated above the soil surface;

Figure 2 shows a plan view of my improved drag attachment;

Figure 3 shows a side elevation of same;

Figure 4 shows a vertical transverse sectional view on the line 4—4 of Figure 2;

Figure 5 shows an enlarged detail sectional view on the line 5—5 of Figure 2;

Figure 6 shows an enlarged detail sectional view on the line 6—6 of Figure 2; and Figure 7 shows a view similar to Figure 2 and illustrating a modification.

The planter shown in the drawing is of the ordinary structure and comprises a main frame 10, supporting wheels 11, a runner frame 12, and runners 13 fixed thereto. The lever 14 provides means whereby the runners may be adjusted to position for furrow opening purposes in the soil, to a position shown by dotted lines in Figure 1, out of engagement with the soil.

My improved drag attachment comprises two angle bars 15 arranged in substantially parallel positions and having at their forward ends means for detachably fixing them to the runner frame of a planter. This means preferably comprises angle bar plates 16 fixed to the angle bars 15, in upright positions, by means of the U bolts 17. These plates are preferably provided with a series of openings 18 to receive bolts 19 for clamping them to the frame members 12 of a planter furrow opening frame. When these frame members 15 are properly fixed to the planter frame they extend downwardly and rearwardly in about the position illustrated in Figure 1, and these frame members 15 have their inner surfaces extended vertically.

The drag attachment frame comprises two similar angle bars 20 placed on top of the horizontally arranged rear portions of the angle bars 15 and pivotally connected by means of bolts 21 extended throughout the upper portions of both angle bars. In this position the horizontal portions of the angle bars 20 rest on top of the horizontal portions of the angle bars 15, and thereby downward movement of the angle bars 20 is limited.

For the purpose of applying a yielding downward pressure to the rear ends of the drag attachment frame I have extended a bolt 22 through the angle bars 15 and 20, and this bolt is extended upwardly through a metal yoke 23 which holds the bolt in an upright position. On the bolt is an extensible coil spring 24 which engages the upper surface of the angle bar 20 and yieldingly holds it downwardly.

At the rear of the frame members 20 are two cross members 26 and 27 connecting the members 20, and secured to the under surface of the drag attachment frame thus formed is an angle bar 28 having two members fixed together at their central portions and being extended forwardly and outwardly to a point spaced beyond the outer surfaces of the frame members 20. These angle bars have their central portions cut away, as shown at 29 in Figure 4. Two plates 30 are fixed in position to cover the spaces between the ends of the angle bars 28 and the adjacent sides of the angle bars 20.

In the modified form shown in Figure 7 I have shown two angle bars similar to the angle bar 28, and these have been numbered 31. One is supported in spaced-apart position in front of the other. Their under surfaces are shaped like that of the angle bar 28 before described.

In practical operation it will be seen that this attachment may be applied to planters of various kinds, and that this may be done readily, quickly and easily. The operator places the runners of the planter in their normal furrow opening position. He then adjusts the drag attachment to about the position shown in Figure 1, and then securely bolts it to the runner frame. When the planter is in normal operation the runner forms a furrow, the seeds are dropped in this furrow, and then the wheels 11 partially cover the furrow with soil.

In Figure 4 I have shown by dotted lines approximately the outline of the soil surface adjacent the furrow. At the central portion there is a slight furrow formed by the wheel and shaped to correspond with the tread surface of the wheel, and at the sides the soil is slightly elevated, as shown by said dotted lines.

With my improvement the angle bars 28 scrape the soil from the elevated portions at the sides of the furrow, as shown by dotted lines in Figure 4, and move it toward the center of the furrow, and then because of the cut-away portions 29 in the angle bars 28, the soil is moved to position leaving a slight ridge over the furrow in which the seeds are planted. At the same time the soil that is engaged by the outer forward ends of the angle bars 28 is moved inwardly and rearwardly by the angle bars, and because of the plates 30 the soil cannot move upwardly at this point and will, therefore, be caused to move inwardly toward the center of the furrow and form the ridge over the furrow.

The springs 24 yieldingly hold the drag attachment downwardly into engagement with the soil surface and they, therefore, cause the drag device to follow uneven surfaces and fill up to some extent any depressions that may be formed in the surface.

I claim as my invention:

1. A drag attachment for seed planters, comprising a frame formed of two angle bars, means for fixing them at their forward ends to a planter, with said bars extended rearwardly, two extension angle bars pivoted to the first mentioned angle bars, the pivots being extended through upright members of the angle bars and the horizontal members of the rear angle bars resting upon and limited as to downward movement by the horizontal members of the main angle bars, a bolt extended through said angle bars at the rear of the pivotal connection, a spring on said bolt for holding the rear angle bars downwardly, and a drag member fixed to said rear angle bars.

2. A drag attachment for planters, comprising two bars adapted to be fixed to a planter and extended rearwardly side by side, a drag member fixed to the rear under surface of said bars, comprising two angle bar members connected together at their rear ends and extended forwardly and outwardly and each having one flat member thereof extended downwardly, the inner portions of said downwardly extended members being cut away for ridge-forming purposes.

3. A drag attachment for planters, comprising two bars adapted to be fixed to a planter and extended rearwardly side by side, a drag member fixed to the rear under surface of said bars, comprising two angle bar members connected together at their rear ends and extended forwardly and outwardly and each having one flat member thereof extended downwardly, the inner portions of said downwardly extended members being cut away for ridge-forming purposes, and plates covering the spaces between the forward ends of said angle bars and the adjacent outer surfaces of the frame bars to prevent soil from moving upwardly at such points and to direct same rearwardly toward the seed and cut-away portion.

4. In a drag attachment for planters, the combination of frame members adapted to be fixed to a planter and to extend rearwardly therefrom, and a series of drag members fixed to the frame one in front of the other, said drag member being formed of angle bars inclined from the longitudinal center of the frame forwardly and outwardly in a substantial V shape, and each having an upright side at the rear, the central portion thereof being cut away to form ridges in the soil being operated upon.

JOHN UNDERATION.